United States Patent
Sugiura

[11] Patent Number: 6,041,144
[45] Date of Patent: *Mar. 21, 2000

[54] IMAGE PROCESSING APPARATUS

[75] Inventor: Susumu Sugiura, Atsugi, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 07/945,396

[22] Filed: Sep. 16, 1992

[30] Foreign Application Priority Data

Sep. 17, 1991 [JP] Japan .................................. 3-236185
Sep. 17, 1991 [JP] Japan .................................. 3-236186

[51] Int. Cl.$^7$ ..................................................... G06K 9/46
[52] U.S. Cl. .......................................... 382/239; 348/419
[58] Field of Search ............................ 382/56, 232, 239; 358/261.2, 430, 432, 433; 348/399, 404, 405, 419

[56] References Cited

U.S. PATENT DOCUMENTS

| | | | |
|---|---|---|---|
| 4,191,974 | 3/1980 | Ono et al. ................................ | 358/430 |
| 4,706,260 | 11/1987 | Fedele et al. ............................ | 348/419 |
| 4,922,273 | 5/1990 | Yonekawa et al. ...................... | 382/250 |
| 5,040,233 | 8/1991 | Davy et al. .............................. | 382/239 |
| 5,051,840 | 9/1991 | Watanabe et al. ....................... | 358/433 |
| 5,089,888 | 2/1992 | Zdepski et al. .......................... | 348/419 |
| 5,159,447 | 10/1992 | Haskell et al. ........................... | 348/419 |
| 5,262,878 | 11/1993 | Esserman ................................. | 358/430 |
| 5,295,077 | 3/1994 | Fukuoka .................................. | 358/432 |

FOREIGN PATENT DOCUMENTS 2105554  3/1983  United Kingdom ................... 358/430

*Primary Examiner*—Christopher S. Kelley
*Attorney, Agent, or Firm*—Fitzpatrick, Cella, Harper & Scinto

[57] ABSTRACT

In an image processing apparatus and method, a color copying interface supports unique compression mode and standard compression mode. If a color work station accepts only data compressed in the standard mode, unique-mode compressed data is converted to standard-mode compressed data, and then the standard-mode compressed data is transmitted together with a compression parameter to the partner computer. The amount of input data is counted by a counter, and the amount of compressed data stored in a compression memory is counted by another counter. Compression parameters used by a compression circuit are selected based on the count values of the two counters.

11 Claims, 2 Drawing Sheets

IMAGE PROCESSING APPARATUS

BACKGROUND OF THE INVENTION

1. Field of the Invention

The present invention relates to an image processing apparatus in which color image data is compressed and decompressed.

2. Description of the Related Art

The assignee of the present invention has proposed, in U.S. patent applications Ser. Nos. 738,562 (filed on Jul. 31, 1991) and 872,142 (filed on Apr. 22, 1992), apparatus which keeps the amount of codes per frame at a constant level by maintaining the amount of code data per block at substantially the same level when performing variable-length coding.

The assignee of this invention has also proposed, in U.S. patent application Ser. No. 753,660 (filed on Aug. 30, 1991), a technique in which, in a still video camera, the amount of code data per frame is kept at a constant level in a continuous shooting mode.

In these arrangements, however, because neither the amount of input image data nor the amount of generated code data is considered, the memory for storing the code data is not efficiently used.

A technique in facsimile communication is known which codes data by the MMR coding scheme and converts MMR codes to MR codes in order to communicate with a receiver that does not have an MMR decoder. However, such conventional schemes fail to provide a sufficient compression ratio when processing multivalue data and, in particular, color image data.

The ADCT (Adaptive Discrete Cosine Transform) scheme developed by the JPEG (Joint Photographic Expert Group) is going to be approved as a standard scheme for coding multivalue image data. However, this ADCT scheme is not satisfactory to achieve both high-quality images and high efficiency because the quantization table and Huffman table used in this method are not variable within a page.

Therefore, there is demand for an apparatus which operates according to both the ADCT scheme and an improved version of the ADCT scheme.

SUMMARY OF THE INVENTION

It is an object of the present invention to provide an image processing apparatus which achieves efficient data compression as well as favorable image quality.

It is another object of the present invention to provide an image processing apparatus which precisely controls the amount of compressed data.

To achieve the above objects, the present invention includes an image processing apparatus comprising: input means for inputting image data; first counter means for counting the total amount of image data input by the input means; compression means for compressing the image data input by the input means with a predetermined parameter for compressing image data; second counter means for counting the total amount of compressed image data; and control means for controlling the parameter of the compression means in accordance with the total amount of image data counted by the first counter means and the total amount of compressed image data counted by the second counter means.

It is still another object of the present invention to provide an image processing apparatus which can compresses image data in a variety of manners so as to be adaptable to a variety of apparatuses.

To achieve this object, the present invention includes an image processing apparatus comprising: input means for inputting image data; compression means for compressing the image data with a predetermined parameter for compressing image data; transmission means for transmitting the compressed image data; and control means for controlling the parameter of the compression means in accordance with the apparatus of a transmission partner.

It is a further object of the present invention to provide an efficient image transmission method.

It is a still further object of the present invention to provide a copying machine having many functions.

It is a further object to provide a compression device suitable to edit images.

Further objects, features and advantages of the present invention will become apparent from the following description of the preferred embodiments with reference to the attached drawings.

DESCRIPTION OF THE PREFERRED EMBODIMENTS

Figure 1:
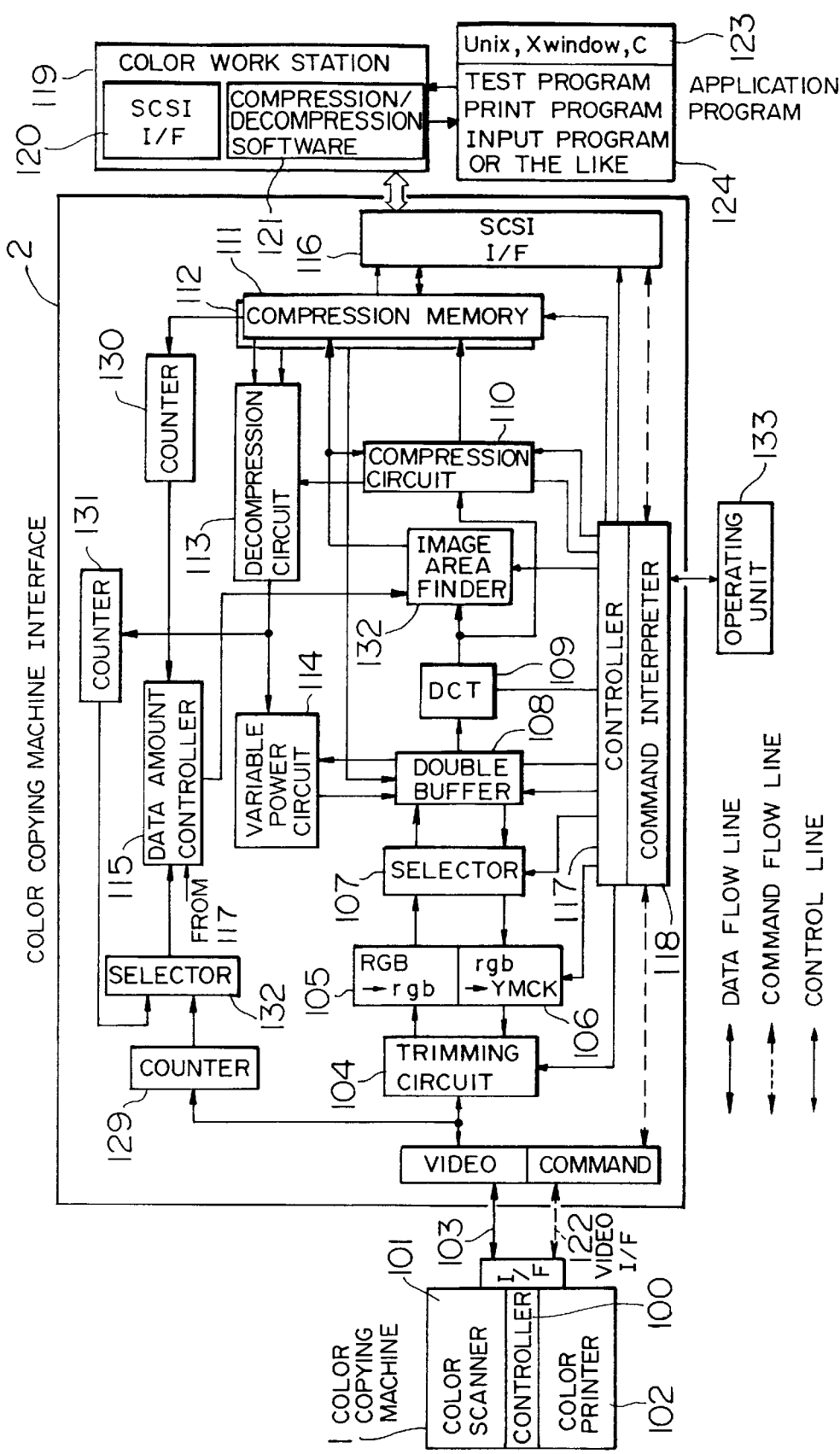
FIG. 1 is a block diagram of the overall construction of an image processing apparatus according to an embodiment of the present invention.

According to the present invention, a method of compressing and decompressing color image data adjusts a scheme which eliminates the problems of the standard coding scheme developed by the JPEG (Joint Photographic Expert Group) to a constant speed recording apparatus such as an electrophotographic recording apparatus.

Since the JPEG standard coding scheme employs a quantization table or a Huffman table which is fixed for a page, the scheme sometimes fails to restore an image of desirable quality from an original document including both photographic images, which cause a low rate of frequency components, and character images, which cause a high rate of frequency components. Such documents are often transmitted by communication through color facsimiles or color DTP. Therefore, the above standard coding scheme is not very useful for the color facsimile or color DTP communication unless the scheme is improved so as to restore images of desirable quality from documents including both photographic images and character images. However, because a unique coding scheme employed by one apparatus will limit the types of apparatuses with which communication is possible, it is advantageous to follow a standard coding scheme. According to the below-described embodiments, a compression communication method can transmit images with high quality and high coding efficiency by using a scheme developed by the assignee hereof to and yet adaptable to the JPEG standard coding scheme by changing coding modes.

A method according to this invention uses the scheme developed by the assignee hereof for transmission with high image quality and high coding efficiency in order to communicate with an apparatus employing the same method. To communicate with an apparatus not employing the same method, the method of the invention uses the JPEG standard coding scheme, in which coding efficiency is lowered to transmit image data for high image quality and image quality is lowered to upgrade coding efficiency.

In a method according to the preferred embodiment, image data is compressed by using coding tables (quantization tables or Huffman tables) suitably selected for blocks of 8×8 pixels in accordance with image area information which indicates kinds of image (e.g., characters or gradation), and then, the compressed image data and image area information are stored. If a communication partner requires data compressed by the standard scheme, the most suitable coding table is automatically selected based on the image area information of the page; alternatively, the user selects a coding table through the operating panel. When a coding table to be used is selected, the stored compressed data is decompressed by using the stored image area information. The decompressed and restored data of one page is coded in the standard mode by using the coding table selected beforehand. The coding table is not changed during compression of the data of one page. The data coded in the standard mode is stored in another compression page memory. The compressed data of the page stored in the compression page memory is transmitted through a transmission cable to the partner.

It is impractical, i.e., too costly, to provide a semiconductor real image memory which stores original image data, in order to transmit image data to a recording apparatus which requires recording at a constant and comparatively great speed, such as electrophotographic recording. Instead, a method is employed which transmits to such a recording apparatus recording data based on data that is obtained by decompressing the compressed image data stored in the memory. However, since the amount of image data obtained by reading a document or the amount of image data transmitted from a host computer varies depending on the image quality, this method causes a problem in that a memory may overflow or a large portion of the memory may be left unused if a compression memory having a pre-fixed capacity is employed. To avoid such a problem, the amount of compressed data stored in the memory must be controlled at substantially the same level. This embodiment employs a method which converts compressed data from a non-standard mode ("CANON mode", hereinafter) to the standard mode or the other way around in order to maintain the amount of compressed data at a constant level. To describe this in detail, in some cases, the amount of compressed data stored in the host computer is great because coding efficiency is lowered and image quality is upgraded. In other cases, the amount of such data is small because coding efficiency is upgraded. Further, the amount of compressed image data obtained from a single image may vary depending on how the image data is compressed. However, in a recording method, such as electrophotographic recording, which requires constant speed recording, the image data for recording in general is recorded in a semiconductor memory having a fixed capacity before being transferred to the recording apparatus. Therefore, because the amount of compressed data from the host computer always varies, buffering for electrophotographic recording cannot be performed. To solve such a problem, an image processing apparatus according to the preferred embodiment processes both image data from an image scanner and compressed or non-compressed data from a host computer so that processed data can provide high quality image and be recorded in a buffering memory having a fixed capacity. A constant speed recording apparatus connected to the apparatus according to the embodiment does not need to have a memory having a large capacity, and therefore can be produced at low cost.

In an image processing method according to the present invention, coding tables for compressing image data of individual blocks of 8×8 pixels are selected based on three factors: image location information in an original image (e.g., indicated by a progress degree of the image scanner and corresponding to the total amount of input image data); the total amount of compressed data (a progress degree of memory address); and image area information on a block to be compressed. If the total amount of original image data increases faster than the total amount of compressed data and the following block to be compressed is a gradation image which includes low level of high-frequency components, a coding table is selected which provides significantly upgraded coding efficiency compared with the coding efficiency provided by the currently-used coding table. If a block is a character image or the like which includes high level of high-frequency components, a coding table is selected which fairly upgrades coding efficiency. Thus, the coding table most suitable based on image area information on a block is not necessarily the coding table that is actually used. Therefore, a memory which stores image area information is corrected by a memory amount control circuit. In this way, the amount of compressed data can be maintained at a constant level, despite changes in the amount of original image data.

An embodiment of the present invention will be described hereinafter with reference to the drawings.

FIG. 1 is a block diagram of the entire construction of an image processing apparatus according to an embodiment. A color copying machine 1 is composed of a color image scanner 101, a color printer 102 and a controller 100. A color copying machine interface 2 connects the color copying machine 1 and a color work station 119 described below. The color copying machine interface 102 internally performs addition operations such as trimming, compression storing and decompression or variable powering of image data. Video interfaces 103 and 122 connect the color copying machine 1 and the color copying machine interface 2. The video interfaces 103 and 122 transmit image data and command data, respectively. A trimming circuit 104 outputs a designated portion of input image to a converting circuit 105. When the color copying machine interface 2 outputs image data, the trimming circuit 104 outputs a designated portion of image data to the color printer 102 for image recording. The converting circuit 105 converts RGB data input from the color scanner 101 to rgb data of standard color space. The converting circuit 105 includes table converters such as a gate array, a RAM, a ROM or the like. A converting circuit 106 converts rgb data input from the standard color space to YMCK signals which are adjusted to the color characteristics unique to the color printer 102. The converting 106 also includes a table converter. A selector 107 selects a flow direction of input ad output data. A double buffer 108 is basically composed of a line memory equivalent to the scanning width of 8 lines×8 pixels in accordance wit the JPEG standard. For example, for 16 pel (about 400 dots per inch) sheet of paper of 210×295 mm, three colors, widthwise lines, the double buffer memory 108 requires memory of 8×16×210×2×3=161.3 Kbytes. A DCT circuit 109 converts the frequency of image data in one-block units of of 8×8 pixels per block in accordance with DCT (Discrete Cosine Transform). An image area finding circuit 132 finds the kind (characters, photographs or shading) of original image in each one-block unit of 8×8 pixels.

The area finding circuit 132 finds the kind of image in these image areas by various methods, such as a finding method using the relation between the DC portion and the AC portion of the DCT circuit 109 or a finding method using the amount of edges. An image area, i.e., a subject area, having many high-frequency components, such as fine lines of characters, provides a large value for image area information. An image area having many low-frequency components, such as a portion of a human face, provides a small value for image area information. Such a piece of image area information is expressed by three bits of data. Image area data thus obtained for each 8×8 pixel block are stored in a memory 112. The memory 112 requires a capacity of 2×210×12×8/(8×8×2)=420 bytes. A compression circuit 110 selects the most suitable quantization table and Huffman table in accordance with image area information of the image area finding circuit 132 and compresses the image data in accordance with the ADCT scheme developed by the JPEG. Because the compression circuit 110 selects a table suitable for each coding block of 8×8 pixels in order to perform coding, image quality and coding efficiency are greatly upgraded though the coding scheme becomes different from the standard coding scheme. The image area information in the memory 109 and the compressed image data are stored in the image area information table 112 having a capacity of one page and a compression page memory 111 having a capacity of one page, respectively. As described below, to communicate with a partner apparatus, such as a host computer, a color facsimile, or the like, which decodes the above-described unique compression scheme in which quantization tables are changed, compressed data and image area information are transmitted through an SCSI interface 116. To communicate with a partner apparatus, such as a host computer, color facsimile, or the like, which does not know how to decode the unique compression scheme, compressed data and image area information are transmitted after being converted to the standard JPEG scheme as described below.

A decompression circuit 113 refers to the image area information to find a quantization table that has been used to compress image data, and then uses an inverted quantization table corresponding to the quantization table in order to decompress the compressed image data.

The decompressed image data is reduced and expanded by a variable power circuit 114 and then written to a double buffer memory 108. The restored image data written in the double buffer memory 108 is compressed in units of a page by using a quantization table designated manually or automatically in accordance with the JPEG standard scheme. The thus compressed image data is transmitted to a host computer 119 through a compression memory 111 and the SCSI interface 116. The compression table data for the page is transmitted to the host computer 119, while image area data stored in the image area information table 112 is not transmitted. The host computer 119 is a color work station that operates under Unix or X-window (TM) and uses, e.g., C. The color work station 119 includes an SCSI interface 120 and a coding software that operates like a software. An application program 124 controls the color copying machine 1 and color copying machine interface 2. Thus, color image data from the color scanner 101 is compressed and sent to the host computer 119.

A controller 117 controls each unit of the color copying machine interface 2. A command interpreter 118 analyzes command from the color work station 119 and accordingly generates control signals. Further, if an error is found, the command interpreter 118 informs the host computer 119 of the error, so that the host computer interlocks the entire system. Counters 129, 130 and 131 count the amount of data. A data amount controller 115 controls the amount of data in accordance with count values provided by the counters 129 to 131. An operating unit 133 supports manual selection of coding parameters, such as quantization tables or Huffman tables.

The operation of the thus constructed apparatus will now be described.

(1) Image Input from the Color Scanner 101

The color scanner 101 comprising line sensors of R(red), G(green) and B(blue) scans a document and accordingly generates 8-bit digital signals. The generated signals are sent, in the order of R, G and B in units of pixel (i.e., for each pixel) through the interface 103 into the color copying machine interface 2.

(2) Internal Processing of the Color Copying Machine Interface

The trimming circuit 104 trims appropriate portions of the RGB signals that are input to the color copying machine interface 2, in units of pixel, from the color scanner 101. Then, the converting circuit 105 converts the trimmed signals to r, g and b signals of the standard color space and sends the r, g and b signals as parallel signals to the double buffer 108. Then, the r, g and b signals are processed in parallel.

The counter 129 counts the total amount of input image data.

(3) Data Compression

Compression of data according to this embodiment is performed as described below.

Image data is compressed by a variable-length compression method. For example, as in the ADCT (Adaptive Discrete Cosine Transform) scheme developed by the JPEG (Joint Photographic Expert Group), the frequency of image data of every block is converted and quantized using a predetermined quantization parameter. Then, the estimated error of DC components in each block is Huffman-coded. The AC components therein is scanned in a zigzag manner and then Huffman-coded.

Figure 2:
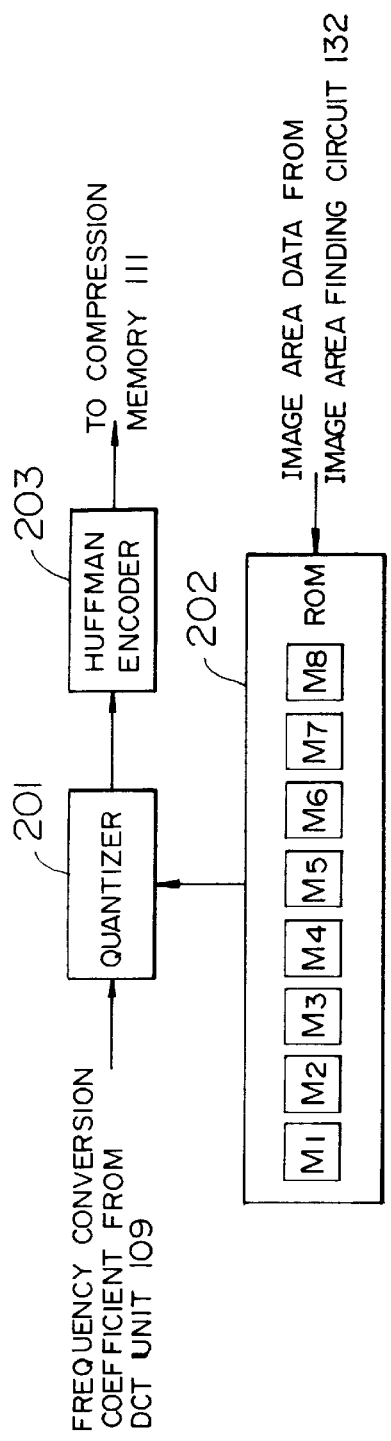
FIG. 2 is a block diagram of a compression circuit.

The construction of the compression circuit 110 is illustrated in FIG. 2.

Referring to FIG. 2, a quantizer 201 linear-quantizes an input frequency conversion coefficient. A ROM 202 stores quantization coefficients. A Huffman encoder 203 Huffman-codes the quantized frequency conversion coefficient.

The ROM 202 stores eight kinds of quantization coefficients M1 to M8 which are two dimensional matrices, each of 8×8 pixels. The quantization coefficients M1 to M8 are so determined that in the order from M1 to M8, the values of the quantization coefficients M1 to M8 for high frequency components becomes greater and the steps of quantization thus increase. An appropriate matrix is selected from the eight kinds of matrices, with reference to image area data (3 bits) from the image area finding circuit 132. Because quantization matrices are selected in accordance with the kinds and states of image to be compressed, efficiency of data compression can be upgraded without causing deterioration of image quality.

The above-described data compression can be performed in parallel with image reading performed by the color scanner 101. The compressed image data is stored in the compression memory 111. The counter 130 counts the amount of data stored in the compression memory 111 (the available capacity of the memory 111), by counting the addresses of the compression memory 111.

Image area data is stored in the memory (image area information table) 112.

(4) Data Decompression

Data decompression is performed by processing the compressed image data stored in the compression memory 111 in the reverse procedure of data compression by using image area data of individual blocks.

The counter 130 counts the amount of of data stored in the compression memory 111 (the available capacity of the memory 111), by counting the addresses of the compression memory 111. On the other hand, the counter 131 counts the amount of decompressed image data.

(5) Variable Expansion and Reduction

The decompressed image data accordingly expanded or reduced by the variable power circuit 114 and then sent to the double buffer 108. The units from the double buffer 108 to the variable circuit 115 form a loop so that the above processing can be repeated.

The variable power circuit 114 makes it possible to obtain expanding and reducing powers that are beyond the range of powers the color scanner 101 provides during reading image.

(6) Image Area Finding

The characteristics of the input image (characters or photographs, or gradation therebetween) are found by the image area finding circuit 132.

Image data in one-block units are classified into eight groups according to the level of high-frequency components of the conversion coefficient of each block that has been frequency-converted by the DCT unit 109. Image area data of 3 bits are thus generated. As described above, the image of a character causes many high-frequency components. Therefore, image area data indicates a gradation characteristic of a character.

Figure 3:
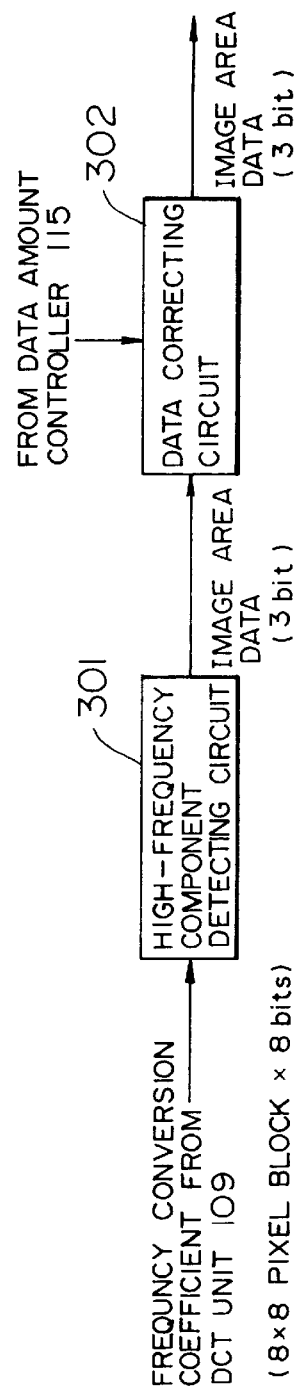
FIG. 3 is a block diagram of an image area finding circuit.

The image area finding circuit 132 is constructed as shown in FIG. 3. A high-frequency component detecting circuit 301 examines the AC components of conversion coefficients of the DCT unit 109 and accordingly generates image area data which indicates the level of the high-frequency components. A data correcting circuit 302 corrects the image area data in accordance with a correction signal from the data amount controller 115.

When image data is input from the color scanner 101, the data amount controller 115 monitors the count values of the counters 129 and 130 and compares the amount of input image data and the amount of increase in compressed data in order to generate correction signals.

For example, if the amount of increase in compressed data is greater than the amount of input image data, the data correcting circuit 302 increases the image area data by one. In other words, if the image data before correction designates use of a table M5, the image data after correction indicates use of a table M6. The correction signals may be multi-value signals in accordance with the relation between the amount of input image data and the amount of increase in compressed data.

Similarly, if the amount of compressed data stored in the compression memory 111 is changed in order to re-store the compressed data in the compression memory 111, the data correcting circuit 302 compares the count values of the counters 130 and 131 to generate correction signals.

The data amount controller 115 generates correction signals corresponding to information on the size of documents. Such information is input to the color copying machine interface 2 through a command interface 122 and sent to the data amount controller 115 through the controller 117. In this embodiment, the color scanner has a capacity for reading a document of 295×420 mm, and accordingly, the compression memory 111 has a capacity for storing compressed image data of one page of a document of the same size. If a document of 210×295 mm is read, the information on the size of the document is provided by a document size detecting means and sent to the data amount controller 115, which then performs the control in accordance with the information on the document size.

In detail, because the amount of color image data input from the scanner 101 or the host computer 119 is predetermined, the entire amount of input data can be calculated beforehand. Also, the memory capacity for compressed image data is fixed due to the hardware. Let it be assumed that the amount of input image data is 10 Mbytes and the memory capacity for compressed image data is 1 Mbyte. On this premise, if image data accumulates of 5 Mbytes has been input and compressed image data of 0.6 Mbyte has been stored, a low compression efficiency results. Then, the data amount controller 115 sends out a command to upgrade the compression efficiently. In this case, if a image area determining circuit in the DCT circuit 109 determines that image data of a block carries an image including a high level of high-frequency components, the compression circuit 110 selects a compression table which provides lower image quality and higher compression efficiency than the image quality and the compression efficiency provided by the compression table that would be otherwise selected. If image data of 5.0 Mbyte has been input and image data of 0.4 Mbyte has been output, the data amount controller 115 sends out such a command that the compression circuit 110 selects a compression table which provides high image quality and low compression efficiency, even for image data having a low level of high-frequency. The amount of compressed image data stored in the memory is thus controlled at a constant level, despite changes in the amount of information of original images.

(7) Input from a Computer

Original image data and compressed image data can be input from the host computer 119 through the SCSI interface 116.

If original image data is input, the image data is sent from the SCSI interface 116 to the double buffer 108 and then processed in the procedure as described above.

If compressed image data is input, different processing procedures are selected for the input data which has been compressed using quantization parameters variable in accordance with image areas (referred to as "unique-mode compressed data" hereinafter) and the input data which has been compressed using in a frame a constant quantization parameter (referred to as "standard mode compressed data" hereinafter).

If unique-mode compressed data is input, this compressed data is stored in the compression memory 111 through the SCSI interface 116. Image area data of individual blocks is stored in the memory 112.

If standard mode compressed data is input, this compressed data is stored in the compression memory 111, and the quantization table used for compressing the image data of a frame is stored in the memory 112. In this case, the compressed data can be decompressed, re-compressed in the unique mode and then re-stored in the compression memory 111.

If the amount of the compressed image data of a frame exceeds the capacity of the compression memory 111, the image data of the frame is re-compressed so as to be stored in the compression memory 111. Information on the amount of compressed image data is sent from the host computer 119 to the command interpreter 118.

(8) Image Reproducing

To reproduce the image based on the compressed data stored in the compression memory 111, the decompressed image data is real-time processed in accordance with the recording speed of the color printer 102.

The restored image data, which has been decompressed and variably powered, is sent through the double buffer 108 and the selector 107 to the color space converting circuit 106. The converting circuit 106 converts the restored image data to recording color signals (Y, M, C and K). Then, the trimming circuit 104 trims appropriate portions of the recording signals. The trimmed recording color signals are transmitted through the video interface 103 to the color printer 102.

A control command to control initiation of recording or the like is transmitted through the other video interface 122.

Because this embodiment employs an electrophotographic printer of multi-transfer type which comprises a combination of a photosensitive drum and a transfer drum and repeats the transfer process four times, for the recording color signals Y, M, C and K, respectively, the four recording color signals Y, M, C and K of a frame must be serially transmitted to the printer 102. Therefore, reading from the compression memory 111 is repeated four times, for the four colors, and the color space converting circuit 106 serially outputs recording color signals of a frame in the order of Y, M, C and K.

(9) Output to a Computer

Original image data and compressed image data can be output through the SCSI interface 116.

Original image data is transmitted from the double buffer 108 through the SCSI interface 1216 to the host computer 119.

To output compressed image data, different processing procedures are selected depending on whether the partner computer in question accepts unique-mode compressed image data.

If the partner computer supports the unique mode, the unique-mode compressed data and compressed table data can be transmitted. In other words, color image data with high image quality and high coding efficiency can be transmitted. On the other hand, if the partner computer supports only the standard mode of the JPEG scheme, these data can not be transmitted unless the data are converted to the standard JPEG scheme as described below.

Using table data stored in the memory 112 determined by unique-mode compressed data of a page, image area information on a block of 8×8 pixels and information on the amount of compressed data stored in the compression buffer memory 128, the decompression circuit 113 decompresses and restores the compressed data in units of a block of 8×8 pixels. The decompressed and restored data is processed by the variable power circuit 114 and then restored in the double buffer memory 108. Then, the restored data is re-compressed by using a single compression table for one page, re-stored in the compression memory 111, and then transmitted through the SCSI interface 116 to the host computer 119. This compressed data is the standard JPEG data since the data of one page has been compressed without changing tables, as described above. Since image data of one page is compressed by using a single table, the amount of compressed data stored in the compression memory 111 can not be controlled. Therefore, writing the data of one page into a fixed one page memory is not always possible. However, if the partner computer has a hard disk like a host computer, a small change in the amount of compressed data to be stored will not cause a problem. A problem, such as memory overflow, is caused if the partner computer has only a memory having a fixed and limited capacity, such as a semiconductor memory.

Though image data is compressed with respect to each of the planes, r, g and b of the standard color space in this embodiment, image dat may be compressed with respect to brightness and chromaticity, such as (L*, a*, b*), (Y, Cr, Cb), (Y, I, Q). In such a case, image area finding should preferably be performed based on brightness signals.

The printer need not necessarily be of electrophotographic type but may be of ink-jet thermal transfer type. Further, a so-called bubble-jet printer may be used, whose head ejects droplets by utilizing film boiling caused by thermal energy.

The compression method is not limited to the ADCT scheme. The coefficient of the Huffman table may be varied, instead of varying the coefficient of the quantization tables as described above.

As understood from the above description, the present invention expands applicability of an image processing apparatus which compresses image data.

Also, the present invention achieves efficient data compression while maintaining desirable image quality.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. An image processing apparatus comprising:

input means for inputting non-compressed image data for each of a plurality of pixels:

first counter means for counting a first total amount of non-compressed image data which has been input by said input means and outputting a first counted value representing the first total amount, wherein the first total amount of the non-compressed image data is independent of the spatial characteristics of the non-compressed image data;

compression means for compressing the non-compressed image data input by said input means, wherein the compression is controlled in accordance with a controllable parameter that controls a compression ratio, said compression means including orthogonal transforming means for transforming the image data into orthogonal transformed coefficients and quantizing means for quantizing the orthogonal transformed coefficients based on the controllable parameter;

second counter means for counting a second total amount of compressed image data which has been compressed by said compression means from the input image data and outputting a second counted value representing the second total amount; and control means for controlling the parameter used by said compression means in accordance with the first and second counted values.

2. An image processing apparatus according to claim 1, wherein said input means comprises a host computer.

3. An image processing apparatus according to claim 1, wherein said input means comprises an image scanner including a CCD sensor.

4. An image processing apparatus according to claim 1, wherein the parameter used by said compression means comprises a quantization parameter.

5. An image processing apparatus according to claim 1, wherein the parameter used by said compression means comprises a Huffman table.

6. An image processing apparatus according to claim 1, further comprising means for distinguishing kinds of images represented by the image data input by said input means.

7. An image processing apparatus according to claim 6, wherein said control means controls the parameter used by said compression means in accordance with the distinguished kind of the images.

8. An image processing apparatus according to claim 1, wherein image data inputting by said input means and image data compressing by said compression means are performed in parallel, and said control means controls the parameter used by said compression means, in real time at a predetermined interval.

9. An image processing apparatus according to claim 1, wherein said input means inputs compressed image data, and said compression means decompresses the compressed image data input by said input means and then re-compresses such image data.

10. An image processing apparatus according to claim 1, wherein wherein said control means controls the parameter used by said compression means so that the amount of the compressed image data for one frame will be maintained at a constant level.

11. An image processing method comprising the steps of:

inputting non-compressed image data for each of a plurality of pixels;

a first counting step of counting a first total amount of non-compressed image data which has been input in said input step and outputting a first counted value representing the first total amount, wherein the first total amount of the non-compressed image data is independent of the spatial characteristics of the non-compressed image data;

compressing the non-compressed image data input in said input step wherein the compression is controlled in accordance with a controllable parameter that controls a compression ratio, said compressing step including the steps of orthogonal transforming the image data into orthogonal transformed coefficients and quantizing the orthogonal transformed coefficients based on the controllable parameter;

a second counting step of counting a second total amount of compressed image data which has been compressed in said compression step from the input image data and outputting a second counted value representing the second total amount; and controlling the parameter used in said compression step in accordance with the first and second counted values.

* * * * *